Aug. 9, 1927.  1,638,316

L. BLACKMORE

VEHICLE HAVING BRAKES

Filed Jan. 31, 1923

Inventor

Lloyd Blackmore

Patented Aug. 9, 1927.

1,638,316

UNITED STATES PATENT OFFICE.

LLOYD BLACKMORE, OF HIGHLAND PARK, MICHIGAN, ASSIGNOR TO GENERAL MOTORS CORPORATION, OF DETROIT, MICHIGAN, A CORPORATION OF DELAWARE.

VEHICLE HAVING BRAKES.

Application filed January 31, 1923. Serial No. 616,055.

This invention relates to vehicles, and is illustrated as embodied in an automobile having brakes on its front or steering wheels.

An object of the invention is to provide simple but efficient brakes which will not be affected by the steering movements of the wheels, by mounting a brake-operating cam substantially in alignment with the steering axis of each wheel. Preferably each cam is supported by the king pin connecting the knuckle for the stub axle of its wheel with the front axle proper, so that there is no possibility of losing the described alignment, by looseness in the connections or otherwise. According to another feature of the invention, the cam is operated by connections, such as a rock-shaft device, slidably and universally connected to the spring-supported chassis frame so that they automatically compensate for movement of the springs.

Other features of the invention, including various novel combinations and desirable specific constructions, will be apparent from the following description of the illustrative embodiments of the invention shown in the accompanying drawings, in which.

Figure 1:
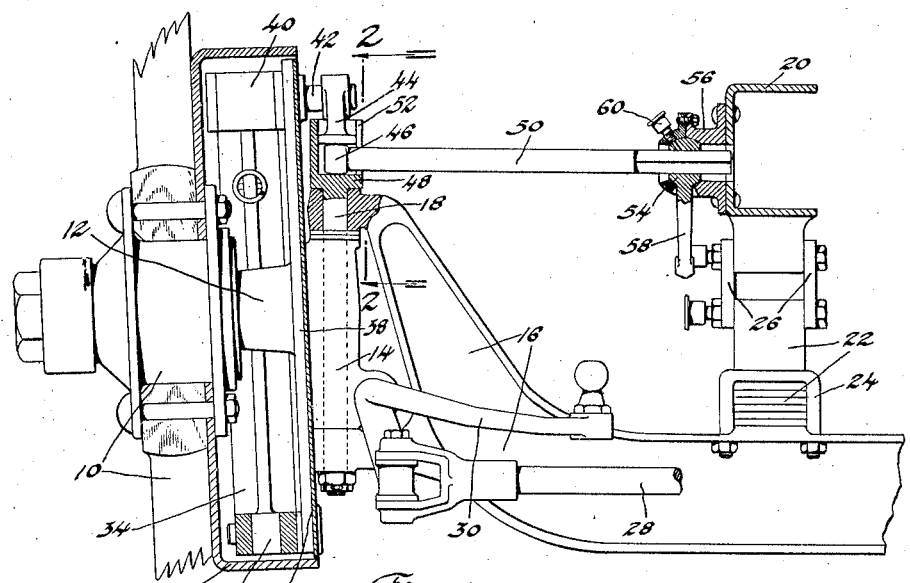
Fig. 1 is a vertical section through the front wheel and brake and part of the chassis frame.

As shown in Fig. 1, a wheel 10 is mounted on a stub axle 12 formed on a knuckle 14 connected to axle 16 by a king pin 18. The axle supports a chassis frame 20 through the medium of springs 22 connected to the axle by U-bolts 24 and to the frame by links 26. The knuckles carrying opposite front wheels are connected to move together by a tie-rod 28, and are turned to one side or the other in steering by means of a steering arm 30. A drum 32 is secured in any suitable manner on wheel 10, and a band 34, consisting of a pair of shoes, is pivoted at 36 to a plate 38 carried by knuckle 14.

Figure 2:
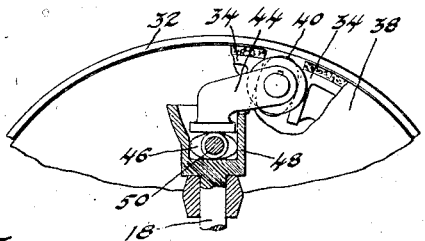
Fig. 2 is a section on the line 2—2 of Fig. 1, showing parts of the brake in side elevation.

According to the present invention, the band is expanded against the drum, to apply the brake, by means of a cam 40 on a short rock-shaft 42 journalled in plate 38, the rock-shaft being operated by a lever 44 the end of which is substantially in alignment with king pin 18. The lever is, in the modification shown in Figs. 1 and 2, engaged by a double cam 46 enclosed in a cup 48 formed in the upper end of king pin 18, in such a manner as to be held positively in alignment with the king pin. The cam is carried by or formed on a rock-shaft 50 passing through a slot 52 in the side of cup 48.

In order to have as few unsprung parts as possible, the rock-shaft is squared at its opposite end and passed slidably through a ball 54 seated in a socket 56 secured directly to the chassis frame 20. Ball 54 may be formed with an extension arm 58 to serve as a lever for applying the brake. A grease cup 60 may, if desired, be arranged to lubricate the ball and its socket and the sliding joint between the ball and rock-shaft. Extension arm 58 is allowed enough play in passing through socket 56 to permit a limited universal movement sufficient to compensate for the action of the springs 22 supporting the chassis frame.

Figure 3:
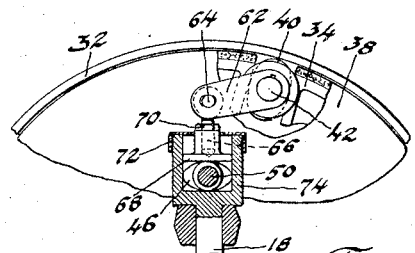
Fig. 3 is a similar view of a modification.

In the modification shown in Fig. 3, the brake-operating cam 40 and its short rock-shaft 42 are operated by a lever 62, corresponding to lever 44, and connected by a pin and slot connection 64 with a stem 66 adjustably threaded in a plunger 68 having a head engaging the cam 46. Adjustment of the stem may be made to take up for wear, and a lock-nut 70 is provided to preserve such adjustments. In this form of the invention a dust-cap 72 protects cup 74, corresponding to cup 48.

Figure 4:
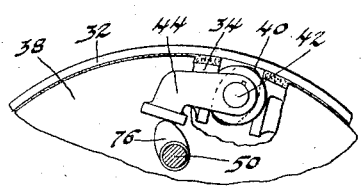
Fig. 4 is a similar view of a further modification.

In the modification shown in Fig. 4, a single cam 76 is provided, corresponding to the double cam 46. With this form of cam, rocking shaft 50 does not lift it, as when a double cam is used.

While several illustrative modifications of my invention have been described above, it is not my intention to limit its scope thereby, or otherwise than by the terms of the appended claims.

I claim:

1. In brake mechanism for motor vehicles and in combination with a knuckle having a stub axle for supporting a front wheel of the vehicle, and which knuckle is pivotally connected with one end of the front axle of the vehicle through a king pin, a plate carried by said knuckle, a brake drum carried by said wheel, and a brake band supported by said plate and arranged to cooperate with said brake drum; an angularly rotatable cam carried by said plate and whereby said brake band is operated; an angularly rotatable cam supported by and from the upper end of said king pin, and which cam is operatively connected with said first mentioned cam to communicate movement to it; and means carried by the frame of the vehicle and operatively connected with said second mentioned cam to impart angular movement thereto.

2. A vehicle having an axle and a chassis frame, a spring connecting the axle and frame, a wheel having a brake drum, and a knuckle with a stub axle for the wheel and a brake band carried thereby, and which has, in combination, a cam arranged to operate said band, a shaft directly carrying the cam and mounted on the frame by a sliding and oscillatable connection to compensate for the action of the spring, and a king pin connecting the axle and knuckle and formed to provide a bearing supporting said cam.

3. A vehicle having an axle, a chassis frame, a spring connecting the axle and frame, a wheel having a brake drum, a knuckle with a stub axle for the wheel, a plate carried by said knuckle, and a brake band supported by the plate in operative relation to the drum, and which is characterized by having, in combination, a pivotal steering connection between the knuckle and axle, a cam constructed and arranged to operate the band and positioned in alignment with said pivotal connection, a rock-shaft carrying and operating the cam, and a sliding universal connection between the rock-shaft and the frame.

4. A vehicle having a spring-supported frame and an axle and a steering wheel mounted for steering movement with respect to the axle, and which has a brake comprising, in combination, a drum movable with the wheel, a band to engage the drum, a device for operating the band, a cam for operating said device arranged in alignment with the steering axis of said wheel, a rock-shaft for turning said cam, and a lever-operated ball universally mounted on the frame and slidably receiving the rock-shaft but arranged to turn it about its axis to operate the cam.

In testimony whereof I affix my signature.

LLOYD BLACKMORE.